May 16, 1950     J. G. OECHSNER     2,507,811
BATTERY PROTECTOR
Filed Dec. 4, 1945
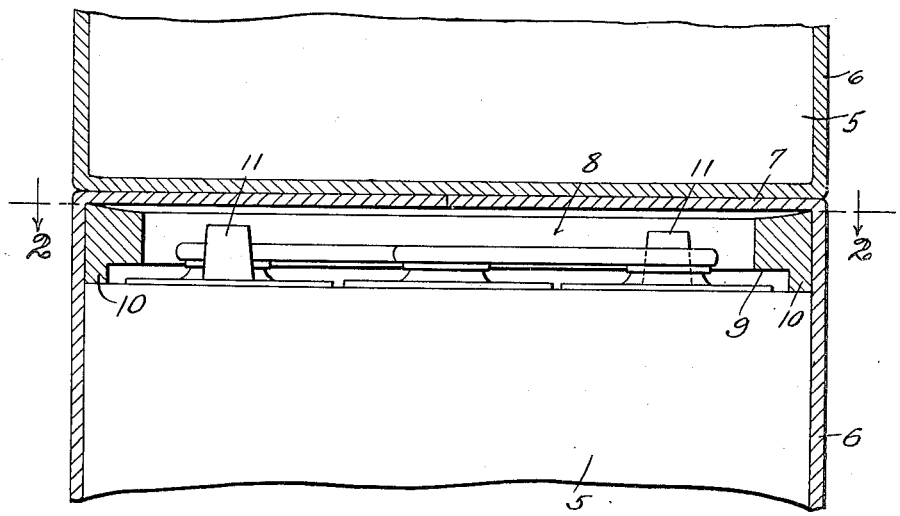
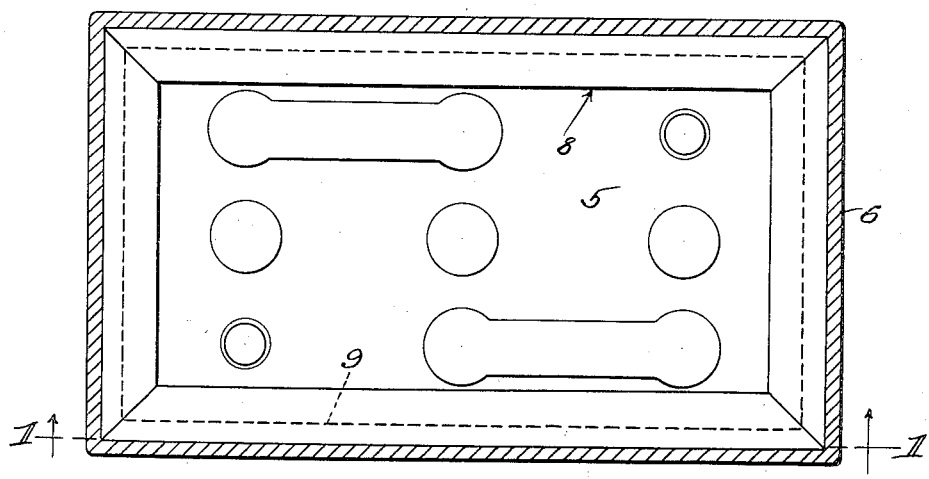
J. G. Oechsner
INVENTOR.
BY
ATTORNEYS.

Patented May 16, 1950

2,507,811

UNITED STATES PATENT OFFICE 2,507,811

BATTERY PROTECTOR

John G. Oechsner, El Paso, Tex.

Application December 4, 1945, Serial No. 632,751

1 Claim. (Cl. 136—181)

This invention relates to storage batteries, the primary object of the invention being to provide means for protecting the usual cardboard container or shipping case of a battery, while in storage or during shipment of a number of batteries, which are usually stacked one upon another.

Another object of the invention is to provide protecting means for the battery posts and filler caps during the time the batteries are stacked one upon another.

Still another object of the invention is to provide means forming a support for an upper battery which will hold the upper battery against slipping from its position on the lower battery.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a sectional view taken on line 1—1 of Figure 2.

Figure 2 is a sectional view taken on line 2—2 of Figure 1.

Referring to the drawing in detail, the reference character 5 indicates a storage battery, and the reference character 6 indicates the cardboard carton in which the battery is shipped, the carton having the usual top 7 to protect the battery posts and filler caps.

The protector forming the subject matter of the present invention is rectangular in formation and of a size to fit snugly within the walls of the cardboard carton above the upper surface of the battery, the protector being indicated generally by the reference character 8.

As clearly shown by Figure 1 of the drawing, the lower surface of the protector is rabbeted as at 9, the rabbet extending inwardly from the inner edge of the protector providing a supporting flange 10 adapted to rest directly on the upper surface of the battery with which the protector is used. The thickness of the protector is such that the upper edge thereof will extend an appreciable distance above the upper ends of the battery posts 11 and filler caps of the battery.

The upper edge of the protector is beveled inwardly from the outer surface thereof so that when a battery is positioned on the top of the carton, the weight of the battery will press the carton into the space formed by the beveled portion, to the end that the battery positioned thereon will be held against slipping with respect to the supporting battery.

These protectors may be secured in position by driving nails through the cardboard carton, however, it is believed that by positioning the protectors under the top or cover of the carton, they will be securely held in place.

From the foregoing it will be seen that due to the construction shown and described, the weight of the upper batteries when positioned one upon another will be supported directly by the upper surface of the battery and will not permit the upper battery to rest on or contact the battery posts or filler caps of a battery, thereby insuring against damage to the battery posts or filler caps during shipment, when the batteries are stacked one upon another.

What is claimed is:

The combination with a battery carton constructed of semi-rigid material and the battery encased therein, of a battery post guard for superimposed storage batteries comprising a supporting frame positioned on the top of the battery under the top of the carton in which the battery is held, the outer upper edge of the frame contacting with the carton above the upper surfaces of the battery posts and filler caps, the upper surface of the frame being beveled inwardly from the outer edge thereof, providing a space between the upper surface of the guard and top of the carton, the top of the carton adapted to bend, conforming to the shape of the beveled surface of the guard under the weight of a battery supported thereon, holding superimposed batteries against lateral movement with respect to each other.

JOHN G. OECHSNER.

REFERENCES CITED

The following references are of record in the file of this patent:

UNITED STATES PATENTS

| Number | Name | Date |
|---|---|---|
| Re. 13,465 | Morton | Sept. 3, 1912 |
| 1,712,782 | White | May 14, 1929 |
| 1,718,086 | Skinner | June 18, 1929 |
| 2,022,595 | Gowing | Nov. 26, 1935 |
| 2,392,675 | Lamb | Jan. 8, 1946 |